Patented Sept. 26, 1933

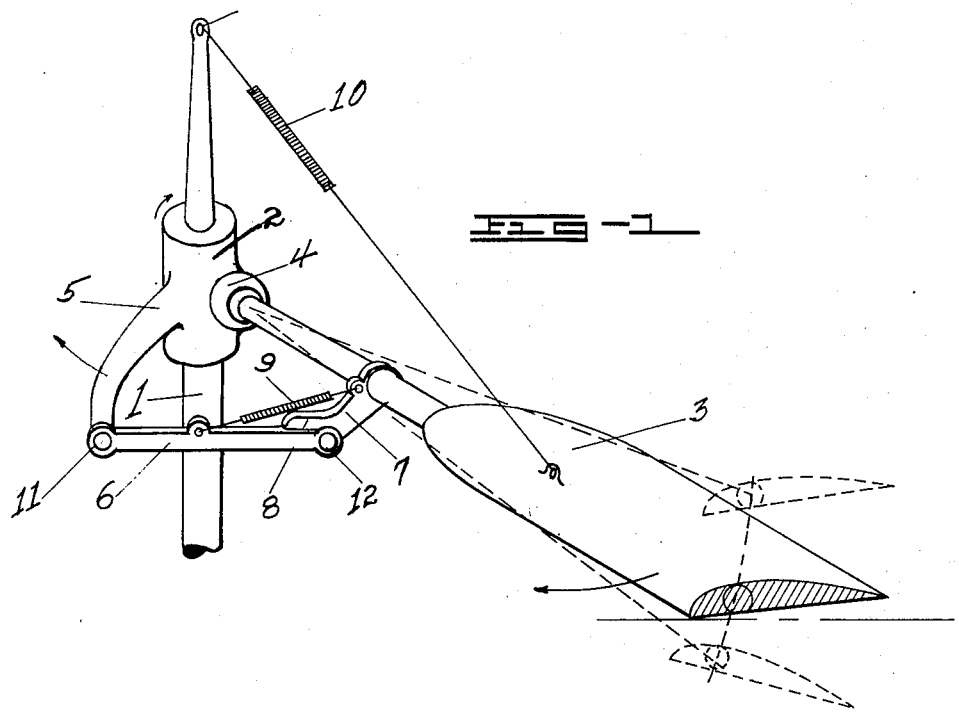
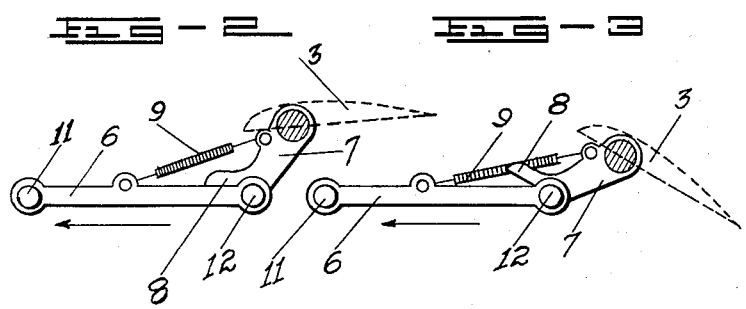

1,927,966

UNITED STATES PATENT OFFICE 1,927,966

LIFTING AIR SCREW FOR AIR VEHICLES

Sidney P. Vaughn, United States Navy, Ackerman, Miss.

Application January 7, 1929. Serial No. 330,753

8 Claims. (Cl. 244—19)

(Granted under the act of March 3, 1883, as amended April 30, 1928; 370 O. G. 757)

I agree that the invention may be manufactured and used by or for the Government for governmental purposes without the payment to me of any royalty thereon.

This invention refers to lifting air screws for air vehicles such as helicopters, and the principal object is to provide a flexible air screw in which the blades automatically attain a positive pitch when a torque force is applied to the driving shaft and automatically attain a negative pitch when the torque force is removed, thereby providing at will a lifting air screw for vertical ascent and a windmill for descent and forward flight.

Another object is to provide an airscrew for supporting air vehicles in the air that is inherently stable under all conditions of flight.

A further object is to provide in an air screw moving in a lateral wind, means for equalizing the lifting forces of the blade rotating in a negative direction to direction of wind with the lifting forces of the blade rotating in a positive direction to direction of wind, thereby causing all blades to transmit a balanced lifting force to the hub of the air screw.

To accomplish these objects and other objects readily apparent in the following description and the accompanying drawing it is necessary to make use of some of the principles used in an air vehicle known as the Cierva autogyro in which a windmill with blades hinged to the hub of the windmill rotate in a lateral wind to provide sustentation when in flight. In other words I am applying mechanical means to the windmill used by Cierva in his autogyro that automatically converts the windmill into a stable lifting air screw when a torque force is applied to the driving shaft of the air screw, and that automatically converts the lifting air screw into a windmill when the torque force is removed from the driving shaft.

In order to understand better the principles involved reference should be made to patents and various published reports and descriptions of the Cierva autogyro, however, the important principles will be set forth in these specifications and in the accompanying drawing in which:

Fig. 1 is a perspective view of one blade of my improved air screw showing the application of the improvements which is applied to every blade used in the air screw.

Fig. 2 shows the normal position and negative pitch of the blades when no torque force is applied to the drive shaft of the air screw and when it is acting as a windmill.

Fig. 3 shows the positive pitch of the blades when a torque force is applied to the drive shaft and the windmill has been converted into a lifting air screw.

Like numerals refer to like parts throughout the drawing.

Referring to Fig. 1 an air screw hub 2 is fixed to a drive shaft 1 which may be driven by any suitable means and which is attached to an air vehicle in any suitable manner to transmit the lifting forces to the air vehicle. The air screw blades 3 are hinged to the hub by a ball and socket joint 4 which permits the blades to rotate on their axes and swing in a limited direction around the hub. This hinging of the blades to the hub is somewhat similar to that used on the Cierva autogyro, in that the blades are kept in the plane of rotation by the centrifugal forces in the same manner as obtained in the autogyro. When the blades are at rest they are supported by a spring 10 connecting guy wires extending from an upward extension of the drive shaft to the top side of the blades about half way between the hub and the tip of the blade. The spring permits the blade to swing a limited distance up and down and around the hub. My improvement consists of an arm or crank 5 fixed to the hub and extending radially therefrom forward of the leading edge of the blade 3 and acts as a torque member to pull the blade through the air by means of a link 6 connecting the end of the torque arm 5 with a depending crank 7 fixed to the blade a short distance outward from the ball and socket joint 4. The link 6 is fastened to the arm 5 loosely by a cylindrical pin 11 and to the crank 7 by a hinge joint 12 in such a manner that the blade is free to swing from a predetermined normal position in a clockwise direction around the hinge joint 12 and in both directions around the pin 11 in the end of the arm or crank 5. The crank 7 has an extension 8 above the link which forms a stop to prevent the blade 3 swinging in an anti-clockwise direction around the hinge joint 12 from the normal position, which is a position that will give the blade a small negative pitch when no torque is applied to the shaft, or, in other words, when the air screw is acting as a windmill. The blade is held in its normal position by a spring 9 connecting the crank 7 with the link 6 which, when a torque is applied to the shaft, permits the blade 3 to swing in a clockwise direction around the hinge joint 12.

In describing the movements of the blades first assume that the air screw is rotating as indicated by arrows in a lateral wind as a windmill in the same manner as the windmill of the Cierva autogyro rotates. Under such conditions the blades of the airscrew will have a slight negative pitch position similar to that illustrated in Figs. 1 and 2, and rotation will continue so long as the wind strikes the under side of the blades.

When a torque force is applied to the drive shaft to rotate the air screw in the direction indicated by the arrows, the drag on the blades will cause them to swing around the hinge joint 12 until the blades attain a positive pitch and attain a lifting force in proportion to the moments acting upon the blades. Since the blades are hinged also to the hub by a ball and socket joint as well as to the end of the torque arm the rotating blades will rise until the centrifugal forces acting upon the blades balance the lifting forces. The resultant of these forces is transmitted to the drive shaft as a lifting force parallel with its axes.

The angle at which the crank 7 is fixed relative to the cord or face of the blade 3 will be determined by the results desired in utilizing the drag, lift, and centrifugal forces acting upon the blade.

By hinging the blades in the manner shown in the drawing it is possible to obtain an equal lifting force on all blades when rotating in a lateral wind. The blade rotating in a positive direction to the wind will rise and the pitch reduced until the lifting forces balance the centrifugal forces acting upon the blade. The blade rotating in a negative direction to the wind will fall and the pitch increased until the lifting forces balance the centrifugal forces. The centrifugal force is the same on all blades while the lift and drag forces acting upon the blades are continually changing, that is, increasing when the blades move into the wind and decreasing when the blades move away from the wind, and unless a mechanism such as described is provided to feather the blades and equalize the lift and drag forces on all blades, the blades will be subjected continually to unbalanced forces that are transmitted to the drive shaft and causes unnecessary strains in material. The movement of the blades is indicated by dotted lines shown in Fig. 1, which is a conical path around the end of the arm 5 with the ball and socket joint acting as the apex of the cone.

It is apparent from the above description that many modifications in structural arrangement may be made without departing from the principles described and the spirit of the following claims and all such modifications I claim.

I claim:

1. In an air screw, the combination of a hub, blades hinged thereto, arms fixed to said hub and extending radially therefrom forward of the leading edge of the blades, means connecting said arms with said blades and embodying means to cause the blade to attain a positive pitch when a torque is applied to the hub tending to rotate the blades, means to cause the blades to attain and maintain a negative pitch when the air screw is rotating freely as a windmill, means to cause the pitch of the blades to change to a lower pitch when the blades rise above the normal plane of rotation, means to cause the pitch of the blades to change to a lower pitch when the blades fall below the normal plane of rotation, and means to sustain the blades in a plane approximately at right angles to the axes of the hub when not rotating.

2. In an air screw, a hub, blades hinged thereto, arms fixed to said hub between the blades and extending radially forward of the leading edge of the blades, means connecting said arms with said blades to cause the blades to attain a positive pitch when a torque is applied to the hub; to cause the blades to attain and maintain a negative pitch when no torque is applied to the hub; to cause the pitch of the blades to change to a lower pitch when the blades are forced to rise above the normal plane of rotation; and to cause the pitch of the blades to change to a higher pitch when the blades are forced to fall below the normal plane of rotation.

3. In an air screw adapted to sustain an air vehicle, a hub, blades hinged thereto, an arm extending from said hub and fixed thereto for each blade, means connecting each blade with its respective arm to cause the blade to attain a positive pitch when a torque is applied to the hub, to cause the blade to attain a negative pitch when no torque is applied to the hub, to cause the pitch of the blades to change to a lower pitch when the blades rise above the normal plane of rotation, to cause the pitch of the blades to change to a higher pitch when the blades fall below the normal plane of rotation, and means to sustain the blades in a plane approximately at right angles to the axis of the hub when not rotating.

4. In an air screw for vehicles, a hub, blades pivotally mounted thereon, arms extending from said hub in front of the leading edge of the blades, and driving means intermediate the arms and blades, said driving means including a spring member to automatically vary the angle of said blades relative to their driving torque.

5. In a propeller, a hub, a blade, means for pivotally mounting the blade to the hub in substantially its longitudinal axis, and a stop means carried by the blade for limiting the anti-clockwise movement of the blade substantially at its negative angle of insidence.

6. In a propeller, a hub, blades pivotally mounted thereto, and toggle jointed means for driving the blades, said means including a spring member to vary the angle of incidence of the blades relative to their driving torque.

7. In a propeller, a hub, blades pivotally mounted thereto, toggle jointed means for driving the blades, said means including a spring member to vary the angle of incidence of the blades relative to the driving torque, and a stop member limiting the anticlockwise movement of the blades substantially at their negative angle of incidence.

8. In an air screw, a hub, blades articulated thereto, a corresponding number of extensions from said hub for each blade, and means connecting each extension with its respective blade to attain a positive pitch when torque is applied to the hub and to cause the blade to attain a negative pitch when the torque is removed.

SIDNEY P. VAUGHN.